United States Patent [19]

Lifshutz et al.

[11] Patent Number: 5,645,627
[45] Date of Patent: Jul. 8, 1997

[54] CHARGE STABILIZED ELECTRET FILTER MEDIA

[75] Inventors: Norman Lifshutz, Nashua, N.H.; Richard E. Gahan, Wrentham; Graham C. Stevens, Quincy, both of Mass.

[73] Assignee: Hollingsworth & Vose Company, East Walpole, Mass.

[21] Appl. No.: 395,661

[22] Filed: Feb. 28, 1995

[51] Int. Cl.$^6$ ....................................................... B03C 3/28
[52] U.S. Cl. ........................... 96/15; 55/524; 55/528; 55/DIG. 5; 55/DIG. 39; 96/68; 96/69; 264/DIG. 8; 264/DIG. 48
[58] Field of Search ........................ 96/15, 17, 55, 96/66, 96, 97, 68, 69; 55/524, 527, 528, DIG. 5, DIG. 39; 128/205.27, 205.29; 428/328, 421, 422; 524/104, 105; 548/229; 95/57, 78, 900; 264/DIG. 8, DIG. 47, DIG. 48; 307/400; 252/561, 567

[56] References Cited

U.S. PATENT DOCUMENTS

| | | | |
|---|---|---|---|
| 3,316,232 | 4/1967 | McGann | 264/166 |
| 3,419,640 | 12/1968 | Burklin et al. | 55/DIG. 39 |
| 4,508,775 | 4/1985 | Adiletta | 428/421 X |
| 4,626,263 | 12/1986 | Inoue et al. | 55/DIG. 39 |
| 4,789,504 | 12/1988 | Ohmori et al. | 55/DIG. 39 |
| 5,025,052 | 6/1991 | Crater et al. | 524/104 |
| 5,038,775 | 8/1991 | Maruscak et al. | 128/205.27 |
| 5,099,026 | 3/1992 | Crater et al. | 548/229 |
| 5,242,747 | 9/1993 | Wu | 55/527 X |
| 5,256,176 | 10/1993 | Matsuura et al. | 55/528 |
| 5,342,434 | 8/1994 | Wu | 55/524 X |
| 5,411,576 | 5/1995 | Jones et al. | 95/57 |
| 5,496,396 | 3/1996 | Allan et al. | 55/DIG. 5 |

FOREIGN PATENT DOCUMENTS

| | | |
|---|---|---|
| 488822A2 | 6/1992 | European Pat. Off. . |
| 0616831A1 | 9/1994 | European Pat. Off. . |
| 623941A3 | 11/1994 | European Pat. Off. . |

*Primary Examiner*—Richard L. Chiesa
*Attorney, Agent, or Firm*—William C. Geary, III; Nutter, McClennen & Fish, LLP

[57] ABSTRACT

An electret filter media includes an additive or mixtures thereof that enhance the charge stability of the media. The filter media achieves acceptable alpha values for a range of filtration challenges without significant decay in alpha values over time. Preferred charge additives include fatty acid amides, oleophobic fluorochemical surfactants, and mixtures thereof.

10 Claims, 15 Drawing Sheets

CHARGE STABILIZED ELECTRET FILTER MEDIA

BACKGROUND OF THE INVENTION

This invention relates to electret filter media having enhanced charge stability.

Electret filter media have long been used in many filtration applications. Electret filter media are those that include a dielectric insulating polymer web that is treated to possess substantially permanent spatially oriented, opposite charge pairs or dipoles. Among the common polymer webs used for electret filter media are polypropylene, polyethylene, polyester, polyamide, polyvinyl chloride, and polymethyl methacrylate.

Conventional filter media are substantially lacking in electrostatic charge and rely upon impingement, impaction and diffusion for filter performance. Electret filter materials offer improved filtering performance over conventional filter materials. The presence of oriented dipoles in the electret filter media is believed to enhance filter performance by allowing the filter media to attract and maintain charged and uncharged particles to be filtered.

Electret filter materials are made by a variety of known techniques. One technique for manufacturing electret filter media involves extruding a polymer, typically having a high melt flow index, through a die having a linear array of orifices. An air knife is used to attenuate the extruded polymer fibers by a ratio of about 300:1. The attenuated fibers, having diameters of about one to ten micrometers, are collected on a rotating drum or moving belt using a moderate vacuum. The fiber web is then treated to impart on the fiber web charge pairs or dipoles. The charge pairs or dipoles can be imparted to the fiber, for example, using AC and/or DC corona discharge.

One problem associated with electret filter material is that the charge pairs or dipoles imparted to the filter media often are not stable. In some instances, charge or its spatial orientation is lost after filtering certain contaminants for relatively short time periods. The result is a marked decrease in filter performance over a relatively short period of time (e.g., less than 20 minutes). The National Institute of Safety and Health (NIOSH) has established standards for performance of certain filters. The NIOSH standards evaluate filters in a carrier after a 200 milligram filtration challenge. One challenge, of solid aerosol particles, evaluates filter performance against solid sodium chloride particles suspended in air. Another challenge, of liquid aerosol particles, evaluates filter performance against liquid droplets of dioctyl phthalate (DOP) suspended in air. Electret filter media generally are able to maintain charge stability and filter performance when filtering solid aerosols, including the sodium chloride test standard. However, liquid aerosols tend to degrade the charge on the electret filter media, and thus filter performance diminishes after only a short period of filtration.

There is thus a need for electret filter media having improved charge stability that are able to maintain acceptable filter performance over time.

Accordingly, it is an object of the present invention to provide a charge stabilized electret filter media. Another object of the invention is to provide electret filter media that are able to maintain filtration performance even after prolonged filtration challenges. It is also an object of the invention to provide filter media that have enhanced filtration performance characteristics. A further object of the invention is to provide electret filter media suitable for a variety of filtration applications, including use in industrial face masks. Other objects will be readily apparent to one having ordinary skill in the art upon reading the following description.

SUMMARY OF THE INVENTION

The filter media of the present invention is an electret polymeric fiber web that includes a charge stabilizing additive. The charge stabilizing additive may be a fatty acid amide; a nonionic, oleophobic fluorochemical surfactant; or mixtures of such compounds. Typically the charge stabilizing additive is present at a concentration in the range of about 0.1 to 2.0% by weight.

The electret polymer fiber web can be made from a variety of polymeric materials, including polypropylene, polyester, polyamide, polyvinyl chloride, polymethylmethacrylate, and polyethylene. Polypropylene is among the more preferred polymeric materials. Typically, the polymer fibers that form the web have a diameter in the range of about 1 to 20 micrometers.

The electret filter media of this invention is characterized by improved filtration performance and enhanced charge stability of the electret polymer web. In particular, the filter media is able to provide desirable filtration properties, as indicated by alpha value, despite continued filtration challenge.

In another aspect the invention relates to a method of manufacturing an electret filter material. According to this aspect of the invention a polymer resin, having incorporated therein a charge stabilizing additive of the type noted above, is processed to yield a web of melt blown polymer fiber in which the charge stabilizing additive is present at a concentration range of about 0.1 to 3.5% by weight. Subsequently, the web is treated to form permanent dipoles in the melt blown polymer web. The permanent dipoles can be imparted to the web by a variety of techniques including AC and/or DC corona discharge.

In one embodiment the manufacturing process can be modified by heat treating the polymer web, which has incorporated therein a charge stabilizing additive, before charging the material by AC and/or DC corona discharge.

The filter material of the present invention can be used in a variety of filtration applications in which a relatively stable alpha value is desired. Among the uses for such filter media are industrial face masks, ASHRAE filters, HEPA filters, and ULPA filters.

All percentages by weight identified herein are based on the total weight of the web unless otherwise indicated.

DETAILED DESCRIPTION OF THE INVENTION

Figure 1:
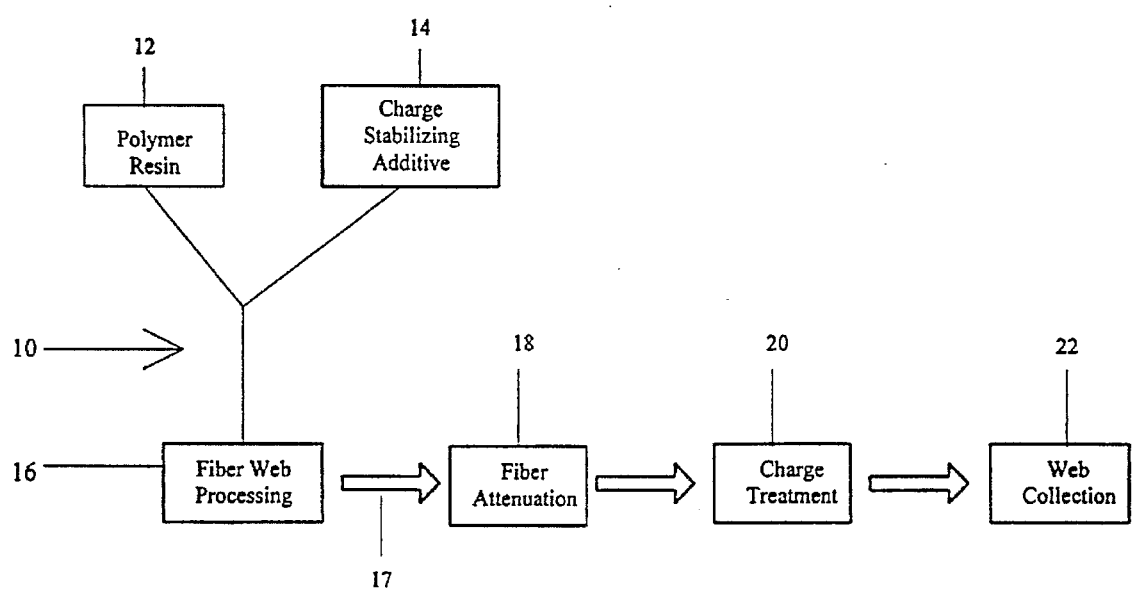
FIG. 1 is a flow chart illustrating a process for manufacturing electret filter media according to the invention.

The present invention provides electret filter media that have improved charge stability. The charge stability is manifested by acceptable alpha levels, with minimal alpha decay, when the filter media are subjected to solid and liquid aerosol challenges. In instances where alpha decay occurs, the final alpha value is still indicative of acceptable filter performance. The filter media of the invention comprise an electret polymer fiber web that includes a charge stabilizing additive or a mixture of charge stabilizing additives. The charge stabilizing additive can be a fatty acid amide; a nonionic, oleophobic fluorochemical surfactant; and mixtures thereof. The nonionic, oleophobic fluorochemical surfactant can be selected from fluorochemical oxazolidinones and stearate esters of perfluoroalcohols. Examples of preferred mixtures of charge stabilizing additives include mixtures of a fatty acid amide compound with either a fluorochemical oxazolidinone or a stearate ester of a perfluoroalcohol.

The charge stabilizing additive can be present in the polymer fiber web at a concentration in the range of about 0.1 to 3.5% by weight. A preferred concentration range for the fatty acid amide charge stabilizing additive is in the range of 0.3 to 1.2% by weight of the web. A preferred concentration range for a fluorochemical oxazolidinone charge stabilizing additive is 0.5 to 1.5% by weight of the web. The stearate esters of perfluoroalcohols, when used as charge stabilizing additives, preferably are present at a concentration range of about 1.0 to 3.0% by weight of the web. Preferably, a mixture of the fatty acid amide and fluorochemical oxazolidinone charge stabilizing additives are used in the formulation such that the mixture contains approximately 0.4 to 0.8% by weight of a fluorochemical oxazolidinone additive and about 0.5 to 1.2% by weight of a fatty acid amide. In a preferred embodiment the charge stabilizing additive includes about 0.5% of the fluorochemical oxazolidinone and 1.2% by weight of the fatty acid amide additive. A preferred mixture of fatty acid amide and stearate ester of perfluoroalcohol charge stabilizing additives includes about 0.6 to 1.3% by weight of the fatty acid amide and about 0.75 to 3% by weight of the stearate ester.

The polymers used to form the fibers of the web can be selected from among many suitable polymers. Examples of these polymers include polypropylene, polyethylene, polyester, polyamide, polyvinyl chloride, and polymethyl methacrylate.

The fiber diameter of the polymer used to form the polymer fiber web generally is in the range of 1 to 20 micrometers. Depending on the intended application, a more preferred polymer fiber diameter is in the range of 3 to 12 micrometers.

The web basis weight of the polymer fiber web will vary depending upon the requirements of a given filtering application. In general, higher web basis weights yield better filtration, but there exists a higher resistance, or pressure drop, across the filter barrier when the filter media has a higher basis weight. For most applications the web basis weight can be in the range of 10 to 520 g/m$^2$. More preferably the web weight is in the range of 30 to 400 g/m$^2$. One of ordinary skill in the art can readily determine the optimal web basis weight, considering such factors as the desired filter efficiency and permissible levels of resistance. Furthermore, the number of plies of the polymer fiber web used in any given filter application can also vary from approximately 1 to 6 plies. One of ordinary skill in the art can readily determine the optimal number of plies to be used.

One useful charge stabilizing additive, as noted above, is a fatty acid amide. Examples of preferred fatty acid amides include stearamide and ethylene bis-stearamide. An exemplary stearamide is commercially available as UNIWAX 1750, available from UniChema Chemicals, Inc. of Chicago, Ill. An exemplary ethylene bis-stearamide is commercially available as ACRAWAX®C which is commercially available from Lonza, Inc. of Fair Lawn, N.J.

As noted above, another suitable charge stabilizing additive is a nonionic, oleophobic fluorochemical surfactant. One example of such a compound is a fluorochemical urethane derivative such as a fluorochemical oxazolidinone. Such compounds are described in U.S. Pat. No. 5,025,052, which is hereby incorporated by reference. An example of a suitable fluorochemical oxazolidinone is commercially available as SCOTCHBAN™ Protector FX-1801 from Minnesota Mining and Manufacturing Company of St. Paul, Minn.

The stearic esters of perfluoroalcohols can also serve as suitable nonionic, oleophobic fluorochemical surfactants that are useful as charge stabilizing additives. Such compounds, which can be fluorochemical intermediates, can have the general structure

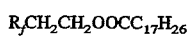

where R$_f$ is CF$_3$[CF$_2$]$_n$ where n is from 3 to 17. An example of such a compound is ZONYL®FTS, commercially available from E.I. du Pont de Nemours & Co., of Wilmington, Del.

Filter performance is evaluated by different criteria. It is desirable that filters, or filter media, be characterized by low penetration across the filter of contaminants to be filtered. At the same time, however, there should exist a relatively low pressure drop, or resistance, across the filter. Penetration, often expressed as a percentage, is defined as follows:

$$Pen = C/C_0$$

where C is the particle concentration after passage through the filter and C$_0$ is the particle concentration before passage through the filter. Filter efficiency is defined as $$100 - \% \text{ Penetration}$$

Because it is desirable for effective filters to maintain values as low as possible for both penetration and pressure drop across the filter, filters are rated according to a value termed alpha ($\alpha$), which is the slope of penetration versus pressure drop across the filter. Steeper slopes, or higher alpha values, are indicative of better filter performance. Alpha is expressed according to the following formula $$\alpha = -100 \log (C/C_0)\Delta P$$

where $\Delta P$ is the pressure drop across the filter.

In many filtering situations it is important to have a high initial alpha value. However, it is equally, if not more important, to maintain acceptable alpha values well into the filtration process. Decaying alpha values is, as noted above, a problem often encountered in certain filtration procedures. In many instances it is thus important to achieve acceptable alpha values well into the filtering process. Some standard tests for evaluating filter performance focus on penetration and resistance (as related by alpha value) after 200 milligrams of loading. Alpha decay is generally not a problem in filtering gases that contain only solids. In fact, in such filtering applications the alpha value often increases over time. The phenomenon of alpha decay is more evident while filtering gases that contain liquid droplets or a mixture of liquid droplets and solid particles.

One of ordinary skill in the art will recognize the need to balance particle penetration across a filter with the resistance to which the filter is subjected during filtration. In addition, it is also necessary to balance high initial alpha values with the alpha values after some degree of filtration challenge. The concentration of charge additives used according to the present invention as well as the identity of the charge additives can be varied to achieve optimal performance of electret filter media.

For example, optimal performance appears to be achieved using 2 percent of a fluorochemical oxazolidinone charge stabilizing additive. However, charge stabilizing additives comprising a combination of approximately 0.5 to 1% by weight of a fluorochemical oxazolidinone and 0.6 to 1.2% by weight of a fatty acid amide (e.g., ACRAWAX®C) achieve lower resistance for a given penetration than does a 2% by weight fluorochemical oxazolidinone additive when used alone. It has also been found that one of the more preferred charge stabilizing additive mixtures is a combination of 0.5% by weight of a fluorochemical oxazolidinone additive and 1.2% by weight of a fatty acid amide (e.g., ACRAWAX®C) because this additive combination achieves acceptable filter efficiencies while using lower web basis weights of the polymer fiber web. Mixtures of about 0.6 to about 1.4% by weight fatty acid amide with about 2 to 3% by weight of a stearic ester of a perfluoroalcohol also yield excellent results.

Filter efficiency and properties of the electret filter media of the invention can also be optimized through additional processing techniques. In one embodiment the polymer web, which has incorporated therein the charge stabilizing additive, can be heat treated before the web is charged or treated to form a permanent dipole. Heat treating the web at this stage of the manufacturing process can enhance the charge stability in the resulting filter media. Heat treatment can usually be conducted at temperatures in the range of about 110° C. to 125° C. for approximately 0.25 to 2.0 hours. Such a pre-charging heat treatment technique is particularly useful to enhance filter performance when a stearic ester of a perfluoroalcohol charge stabilizing additive is used alone, but tends to be less effective when the charge stabilizing additive is a mixture of a fatty acid amide and a fluorochemical oxazolidinone or a stearic ester of a perfluoroalcohol.

Heat treatment can also be applied to the electret filter after charging or formation of the permanent dipoles. Such heat treatment generally results in a lower initial alpha, but the alpha values after a degree of filter loading tend to be higher than those achieved with filter materials that do not receive heat treatment. Heat treatment after charging is preferably conducted at temperatures in the range of 35° to 80° C. for a period of about 6–30 hours. A preferred protocol involves heat treating for approximately 24 hours at 70° C. In general, the nonionic, oleophobic fluorochemical surfactant, particularly the oxazolidinone, appears to be more sensitive to the effects of post-charging heat treatment than are the other classes of charge stabilizing additives. Thus, it is preferred that the concentration of the fluorochemical surfactant be maintained as low as possible (e.g., not more than about 0.5% by weight) in filter media that is to be subjected to post-charging heat treatment.

A variety of techniques are well known to impart a permanent dipole to the polymer web in order to form electret filter media. Charging can be effected through the use of AC and/or DC corona discharge units. In one embodiment charging can be accomplished solely through the use of an AC corona discharge unit. In another embodiment it is useful to use both AC and DC corona discharge units. In a preferred technique the polymer web is first subjected to charging in an AC corona discharge unit followed by one or more successive treatments in a DC corona discharge unit. Charging can also be accomplished using other techniques, including friction-based charging techniques.

One useful technique for processing the electret web of the invention is illustrated in FIG. 1. As illustrated, the filter media can be prepared by forming, such as in an extruder 16, a web of melt blown polymer film from a polymer resin 12, such as polypropylene. The resin includes, in concentrated form, a desired mount of the charge stabilizing additive or the charge stabilizing additive mixture 14. The resulting web 17 can be attenuated at processing station 18, such as by drawing the fibers at a ratio of about 300:1. Thereafter, the web is subjected to charge treatment at station 20 (which can be an AC and/or DC corona discharge unit) to form a substantially permanent charge pairs or dipoles in the melt blown polymer web. In some instances it may be preferred to use only an AC corona discharge unit at processing station 20. Alternatively, charging can be effected using an AC corona discharge unit followed by one or more successive treatments in a DC corona discharge unit. Charging can also be accomplished using other techniques, including friction-based techniques. After charging, the web is collected at station 22.

Subsequent to forming and charging the electret filter media, and as noted above, the media can be subjected to heat treatment to improve charge retention properties of the media. For example, heat treatment may take place at temperatures in the range of about 35° C. to 80° C. for approximately 6 to 30 hours. A preferred heat treatment protocol exposes the media to temperatures in the range of about 70° C. for 24 hours.

In another embodiment the charge stabilizing additive need not be included as a concentrate with the polymer resin. Instead, a liquid form of the additive or additive mixture can be sprayed onto the extruded fibers that form the polymer web.

The following examples serve to further described the invention.

EXAMPLE 1

Samples of electret filter media identified in Table 1 were prepared by melt blown processing of polypropylene resin.

Sufficient quantities of a concentrate of various charge stabilizing additives were included with the polypropylene resin to achieve the concentration levels noted in Table 1. Melt blown polypropylene fibers were prepared and collected in a web. The fiber webs for which the samples were prepared were all manufactured at the same throughput of 0.4 g/hole/min. During processing, air volumes and die temperatures were adjusted to attempt to maintain the resistance of the web approximately the same. The polypropylene webs were then treated by AC and/or DC corona discharge, as noted in Table 1. The resulting electret filter media were processed to yield web basis weights of 40 g/m$^2$.

The samples were tested using challenges of 100 milligrams/m$^3$ sodium chloride at 32 liters per minute (lpm) in an air carrier (solid class only) and 100 milligrams/m$^3$ dioctylophthalate (DOP) at 32 lpm in an air carrier (solid/liquid class) using a test area of 100 cm$^2$. Flat sheets of filter media were used under conditions to approximate use of the filter media in an industrial face mask in which the sample area of the media was 265 cm$^2$, the flow rate was 85 lpm and the loading time was 22 minutes to achieve the loading requirements of 200 mg. For each of the samples, 22 minute DOP challenges and NaCl challenges were conducted using 1, 2, 3 and 4-plies of the 40 g/m$^2$ media.

TABLE 1

Sample Formulations

| SAMPLE | ADDITIVE | ADDITIVE conc. (% by wt.) | TREATMENT |
|---|---|---|---|
| A | FX-1801 | 1.0% | AC/DC |
| B | FX-1801 | 2.0% | AC/DC |
| C | FX-1801 | 0.5% | AC/DC |
| D | FX-1801 | 0.5%/0.6% | AC/DC |
| E | FX-1801/ACRAWAX®C | 0.5%/1.2% | AC/DC |
| F | FX-1801/ACRAWAX®C | 0.5%/1.2% | AC only |
| G | FX-1801/ACRAWAX®C | 1.0%/0.6% | DC only |
| H | FX-1801/ACRAWAX®C | 1.0%/0.6% | AC/DC |
| I | NONE | — | AC/DC |
| J | ACRAWAX®C | 0.6% | AC/DC |

FIGS. 2 through 15 illustrate the data obtained during the NaCl and DOP challenges of these samples.

Figure 2:
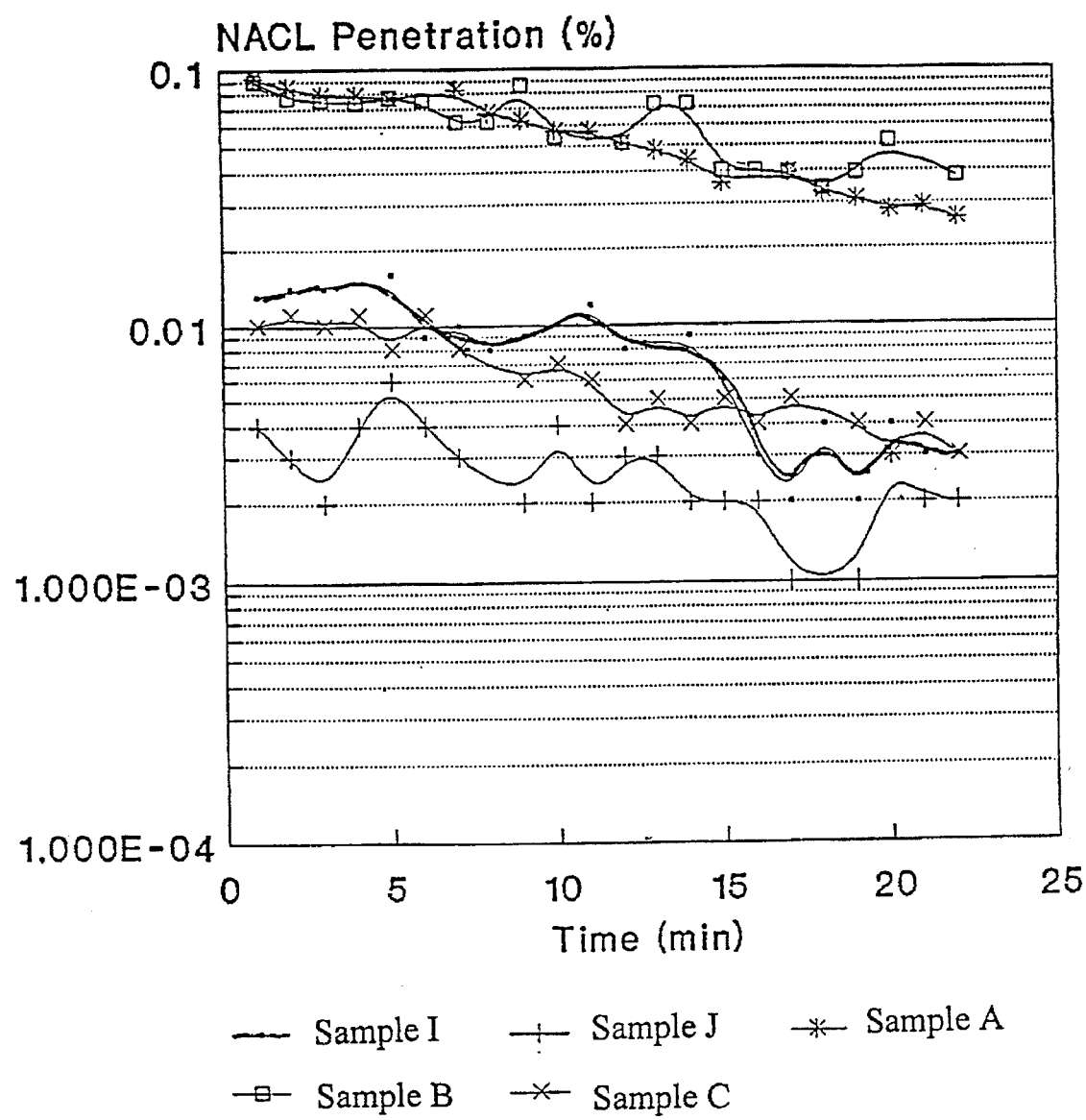
FIG. 2 is a graph plotting the log of NaCl penetration vs. time for various filter media samples.
Figure 3:
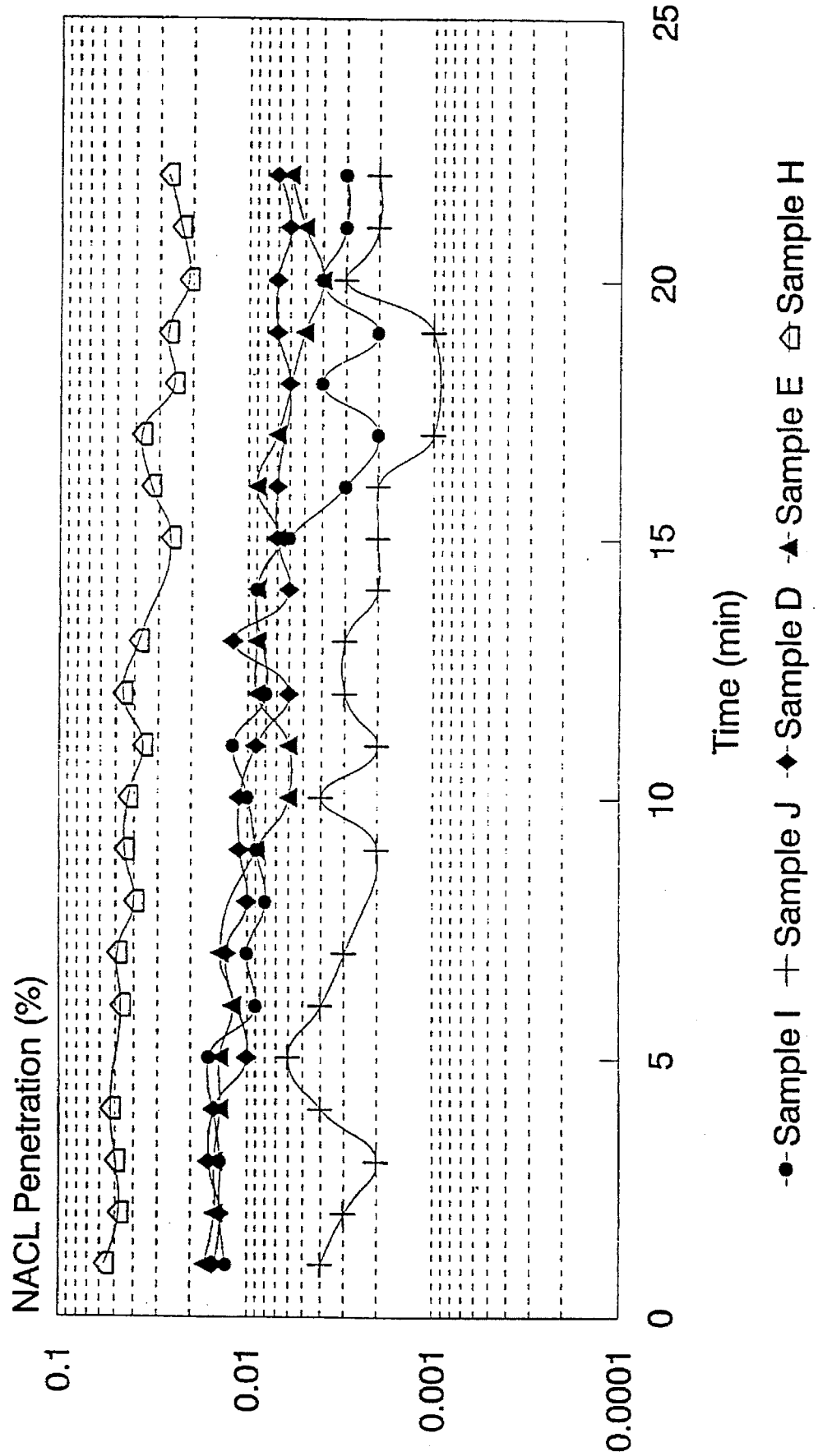
FIG. 3 is a graph plotting the log of NaCl penetration vs. time for various filter media samples.

FIGS. 2 and 3 plot the noted log of penetration versus time for NaCl loading of the Table 1 samples. These data illustrate that the maximum penetration is achieved in the first reading and that percent penetration of NaCl particles decreases over time.

Figure 4:
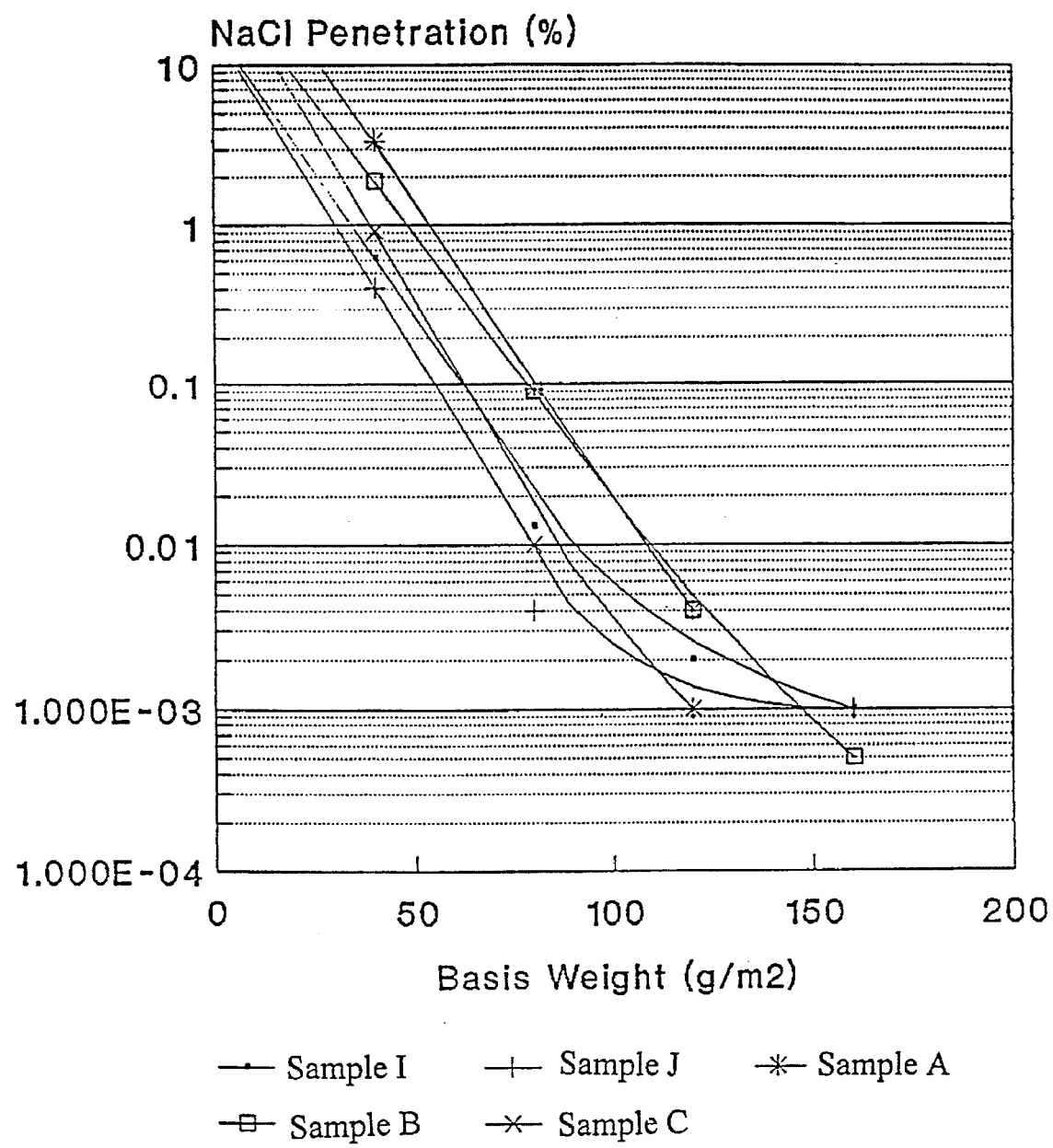
FIG. 4 is a graph plotting the log of NaCl penetration vs. filter media basis weight for various samples.
Figure 5:
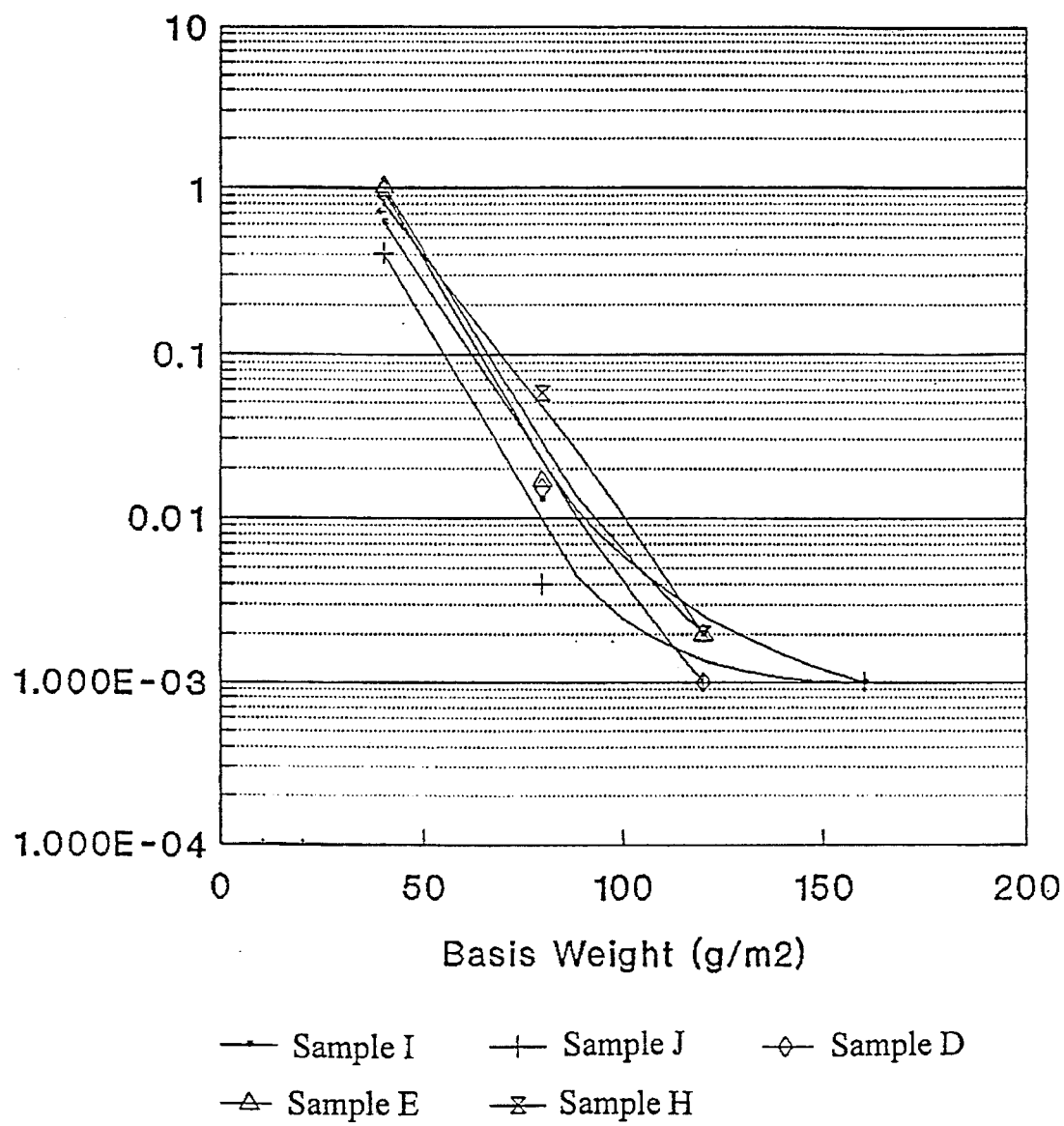
FIG. 5 is a graph plotting the log of NaCl penetration vs. filter media basis weight for various samples.

FIGS. 4 and 5 illustrate the log of penetration versus basis weight for NaCl loading of the identified Table 1 samples. From these data, it appears that sample J (0.6% ACRAWAX®C treated with AC/DC corona discharge) performs best on a penetration/weight basis. Table 2, shown below, illustrates the web basis weight and resistance necessary to achieve 5%, 1% and 0.03% penetration standards. Table 2 reveals that 5% penetration levels can be achieved using web basis weight as low as 20 g/m$^2$ (Sample J); 1% penetration standards can be achieved using web basis weights as low as 40 g/m$^2$ (Sample J); and the 0.03% penetration standards can be achieved using web basis weights as low as of 60 g/m$^2$ (Sample J). Sample I, which includes no charge stabilizing additive, requires slightly higher web basis weights to achieve the same penetration standards.

TABLE 2

Web Basis Weights and ΔP Necessary for NaCl Penetration Standards

| | Web Basis Weight (g/m$^2$) and Resistance ΔP (mm H$_2$O) at NaCl Penetration Level | | | | | |
|---|---|---|---|---|---|---|
| | 5% Pen. | | 1% Pen. | | 0.03% Pen. | |
| Sample | Basis wt. | ΔP | Basis wt. | ΔP | Basis wt. | ΔP |
| A | 40 | 2.0 | 60 | 2.5 | 100 | 4.5 |
| B | 30 | 1.5 | 55 | 2.0 | 100 | 4.5 |
| C | 25 | 2.0 | 45 | 3.0 | 80 | 5.5 |
| D | 25 | 1.5 | 50 | 2.5 | 75 | 4.0 |
| E | 30 | 1.5 | 50 | 2.5 | 75 | 4.5 |
| F | 45 | 2.5 | 60 | 3.5 | 95 | 6.0 |
| G | — | — | — | — | — | — |
| H | 25 | 1.5 | 50 | 2.5 | 80 | 4.5 |
| I | 25 | 2.0 | 45 | 4.5 | 75 | 8.0 |
| J | 20 | 1.5 | 40 | 3.5 | 65 | 5.0 |

Figure 6:
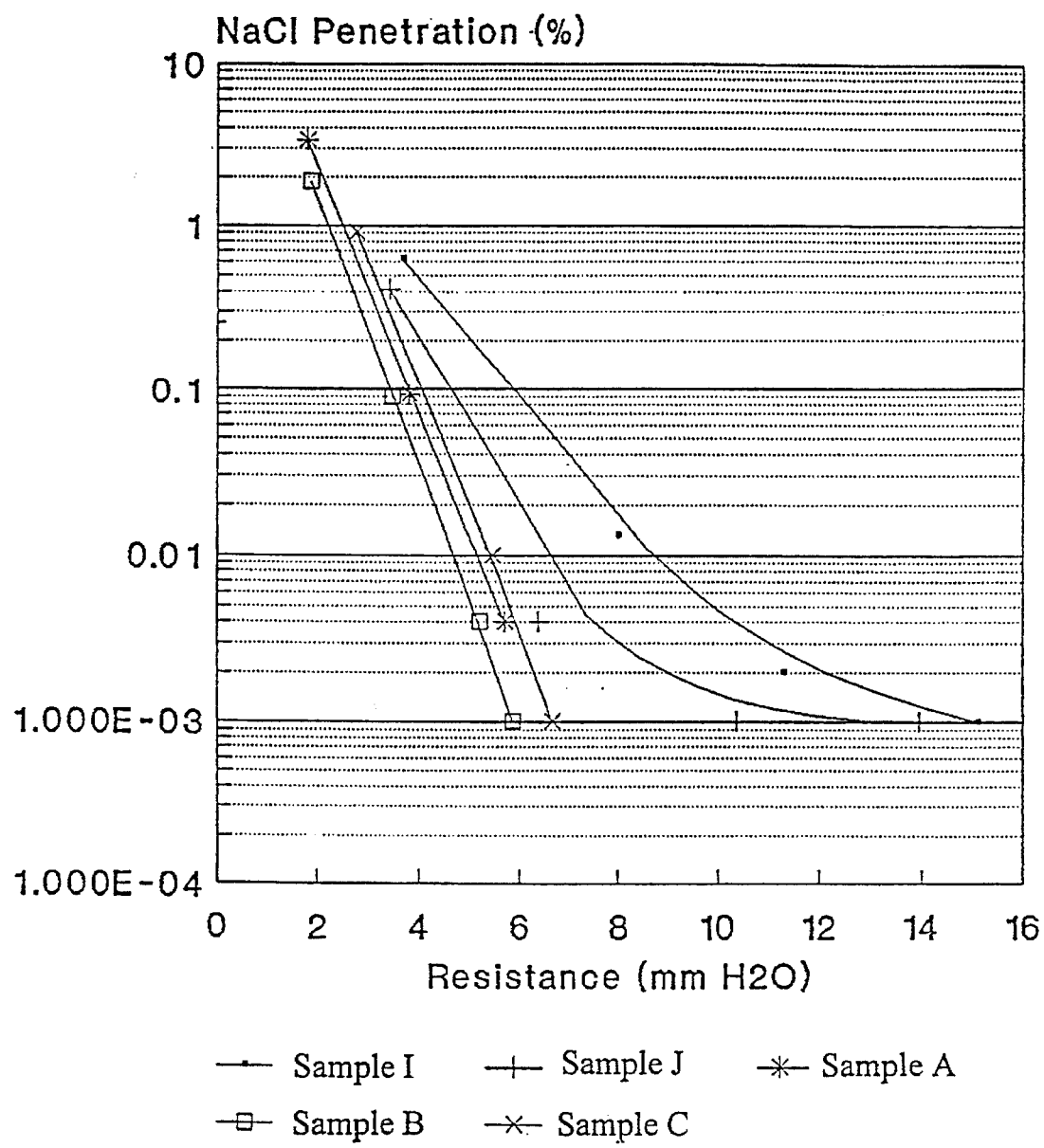
FIG. 6 is a graph plotting the log of NaCl penetration vs. resistance for various samples.
Figure 7:
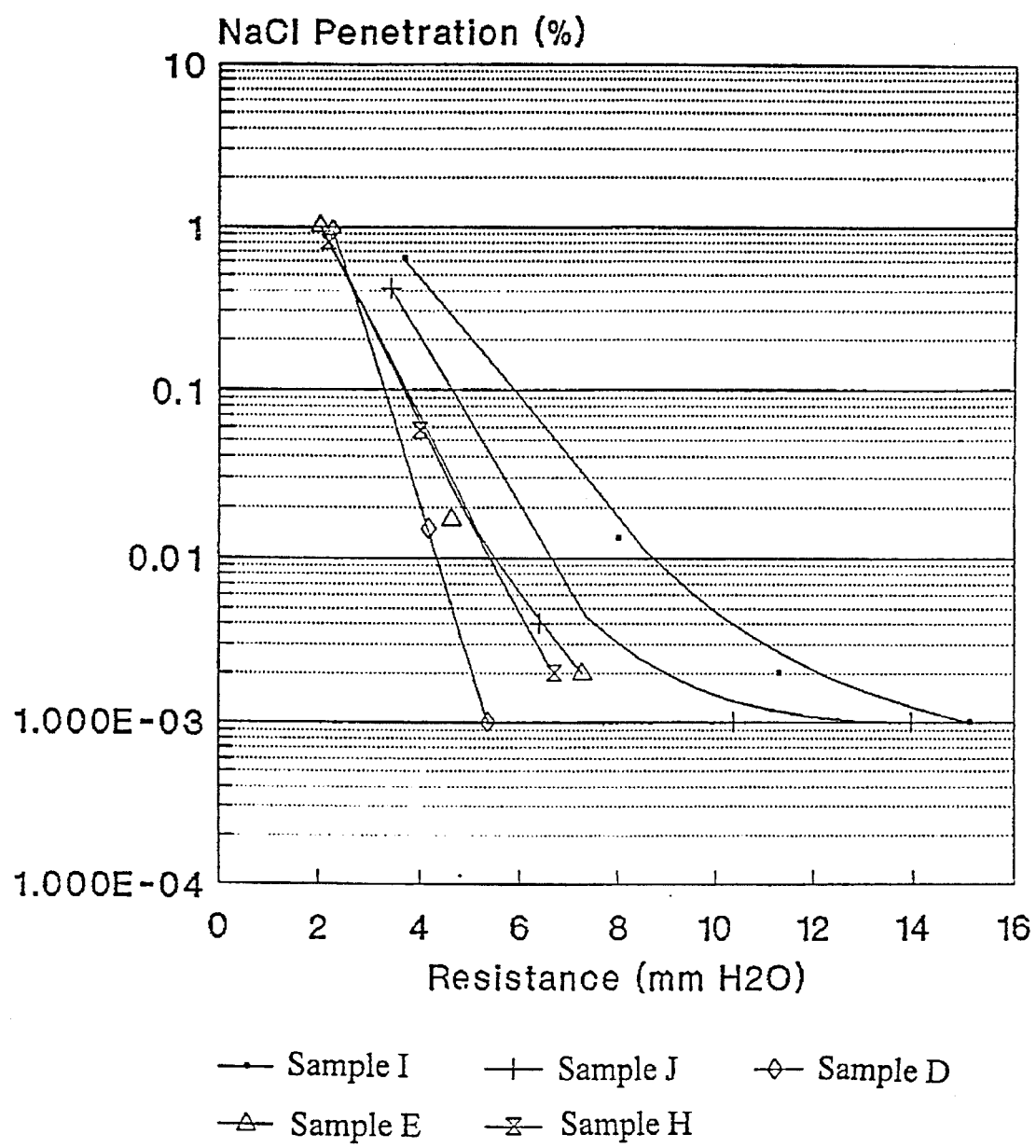
FIG. 7 is a graph plotting the log of NaCl penetration vs. resistance for various samples.

FIGS. 6 and 7 plot the log of NaCl penetration versus resistance for NaCl challenges of the identified Table 1 samples. The slope of the curves obtained represent the alpha values, where steeper (or leftmost) curves indicate higher alpha values and generally superior filter performance. FIG. 6 illustrates that samples containing a fluorochemical charge stabilizing additive generally have lower resistance for a given penetration (higher alpha values) than do samples that do not include any charge stabilizing additive or those that contain only a fatty acid amide charge stabilizing additive. Further, these data illustrate that as fluorochemical content increases the alpha value increases. FIG. 7 illustrates that samples containing a charge stabilizing additive that is a mixture of the fluorochemical compound and a fatty acid amide exhibit better alpha values than samples with no additive (sample I) or samples with only the fatty acid amide additive (sample J). Sample D (0.5% fluorochemical and 0.6% fatty acid amide) appears to offer optimal performance. This sample possesses properties similar to Sample B (2% fluorochemical), but it is more economically produced.

The data obtained for DOP loading of the samples shown in Table 1 is illustrated in FIGS. 8–15.

Figure 8:
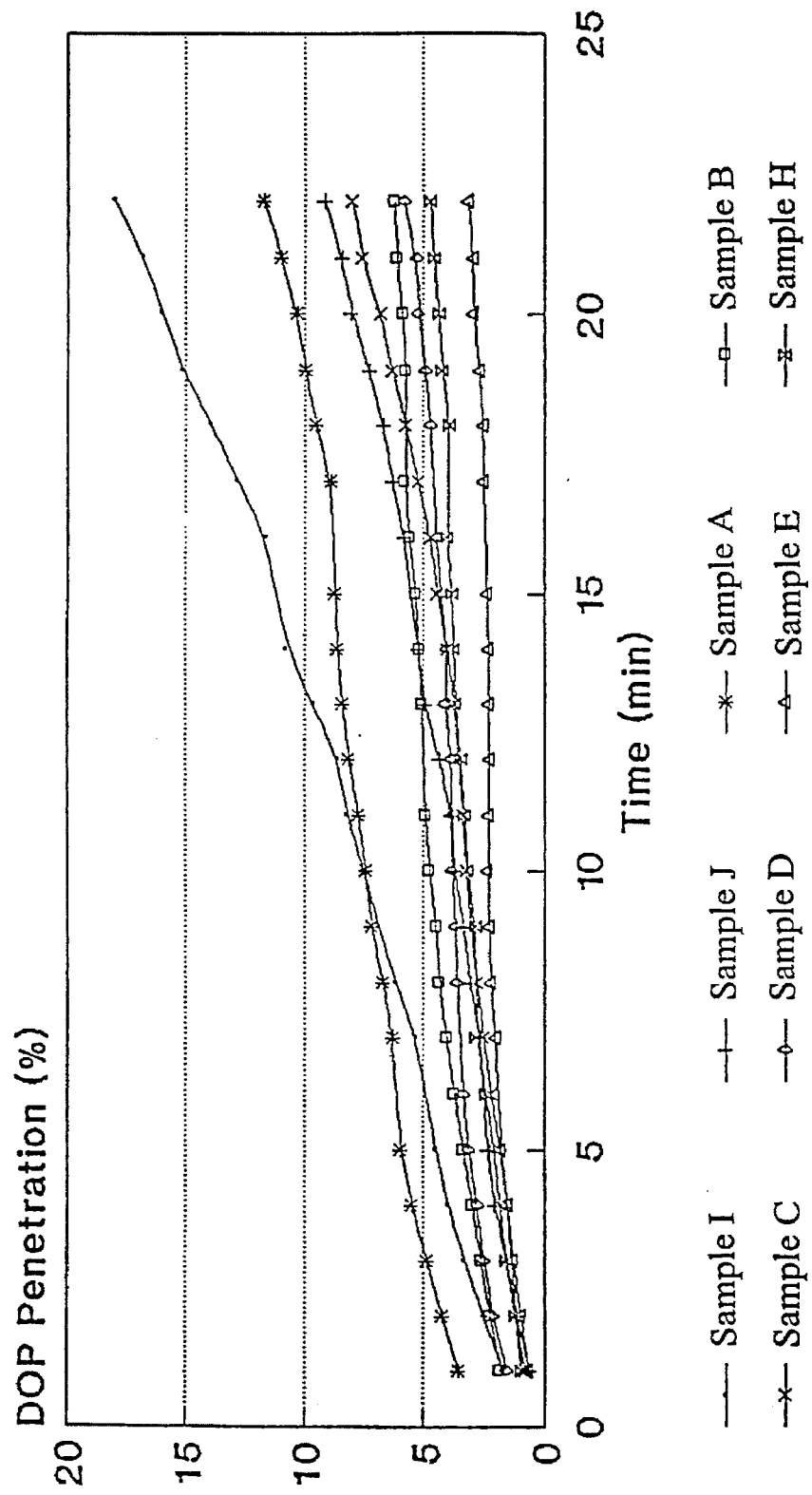
FIG. 8 is a graph plotting percent of dioctyl phthallate (DOP) penetration vs. time for various samples.

FIG. 8 plots percent penetration versus time for DOP loading of the identified Table 1 samples. These data indicate that the percent penetration observed with sample I (which contains no charge stabilizing additive) increases significantly after 22 minutes of loading to achieve the loading requirements of with 200 mg DOP. All of the samples tested indicate that there is at least some degree of increased DOP penetration upon of loading with 200 mg DOP.

Figure 9:
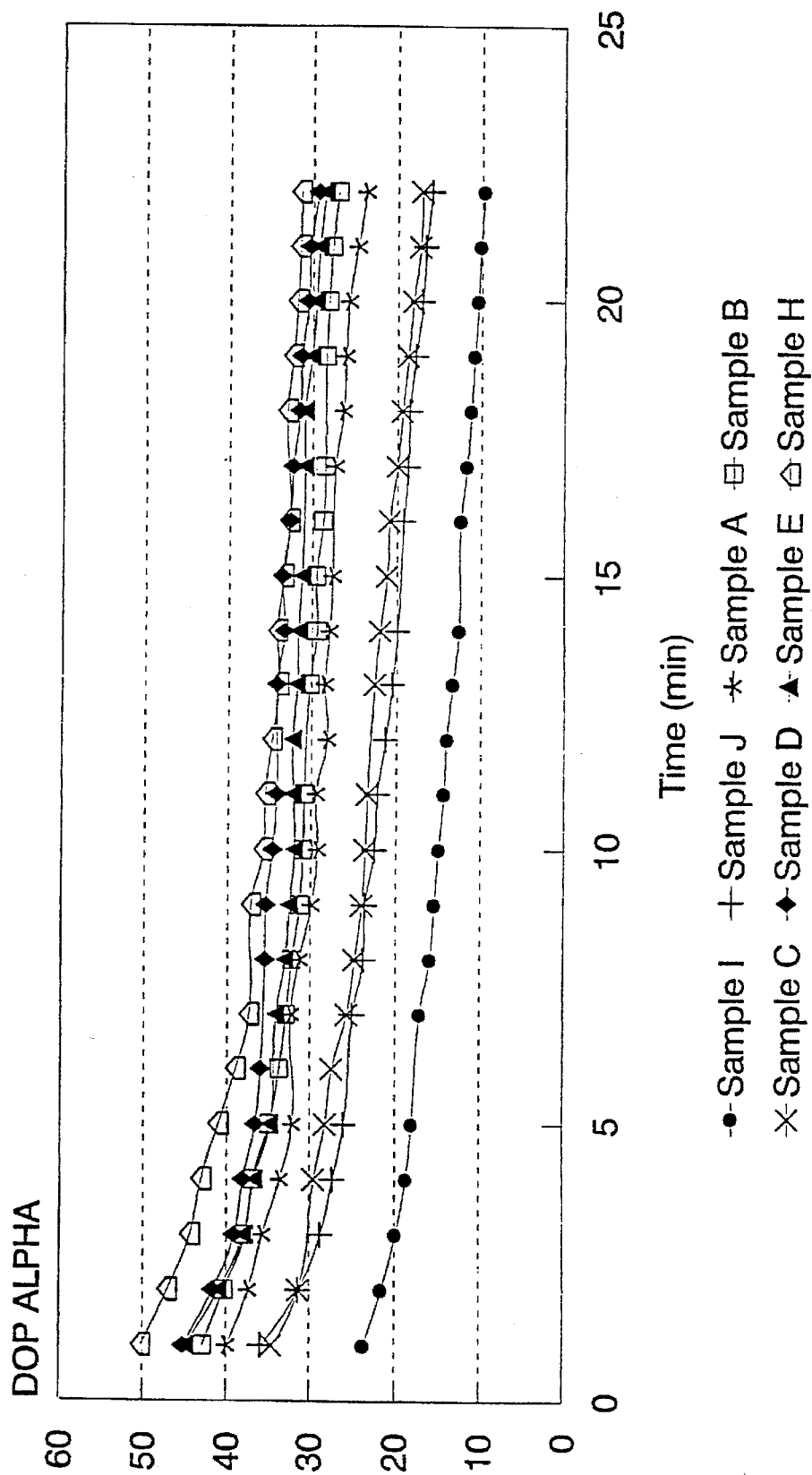
FIG. 9 is a graph plotting the log of DOP penetration vs. time for various samples.

FIG. 9 plots the alpha obtained over time for samples A–E and H–J. This Figure indicates that sample I (which contains no additive) exhibits significant alpha decay to a level (alpha less than 10) where very little charge is evident after 200 mg of DOP loading over a 22 minute period. This Figure also indicates that the highest initial and highest final alpha values were obtained with sample H (1% fluorochemical and 0.6% fatty acid amide).

Figure 10:
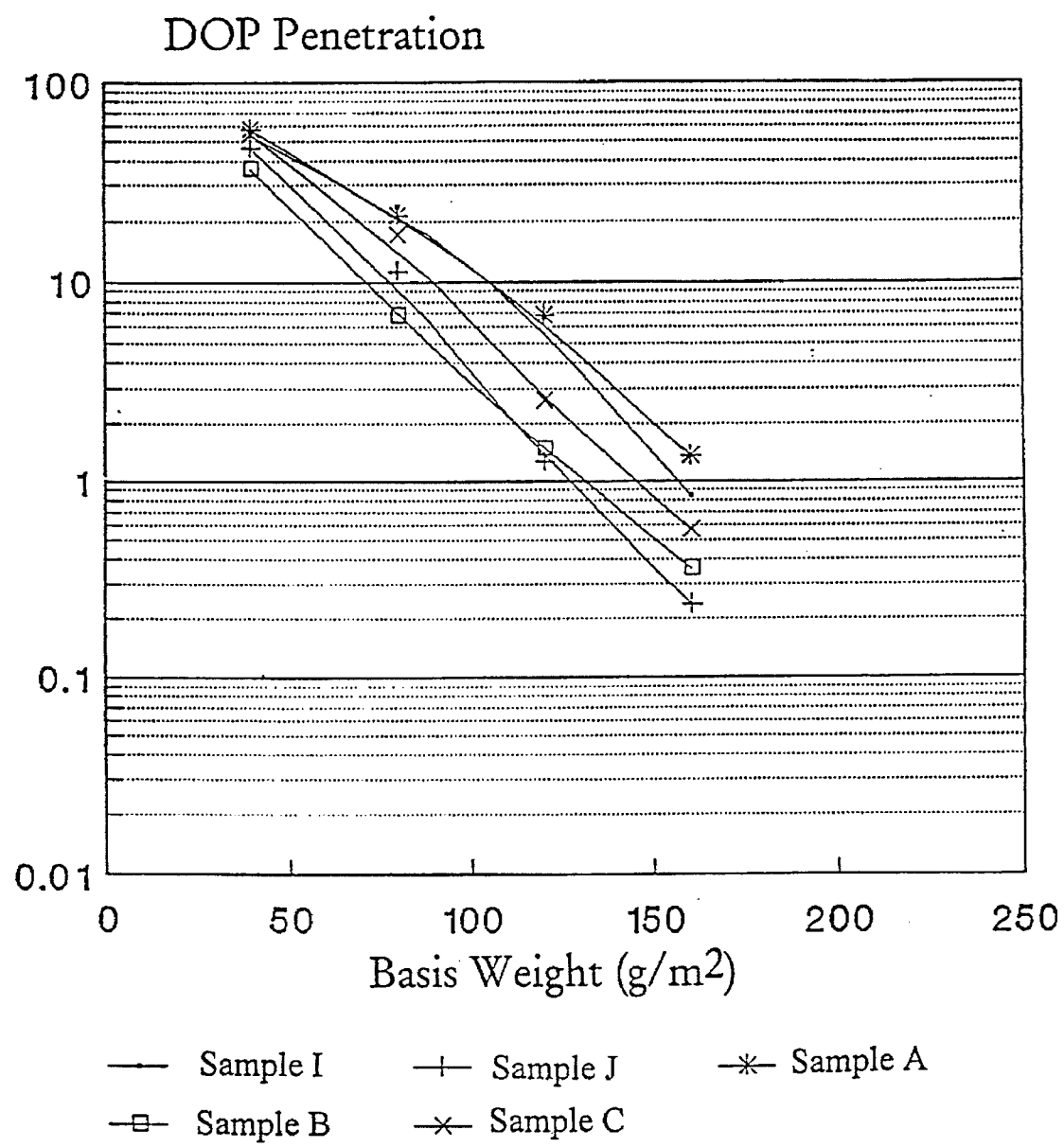
FIG. 10 is a graph plotting percent DOP penetration vs. filter media basis weight for a variety of samples.
Figure 11:
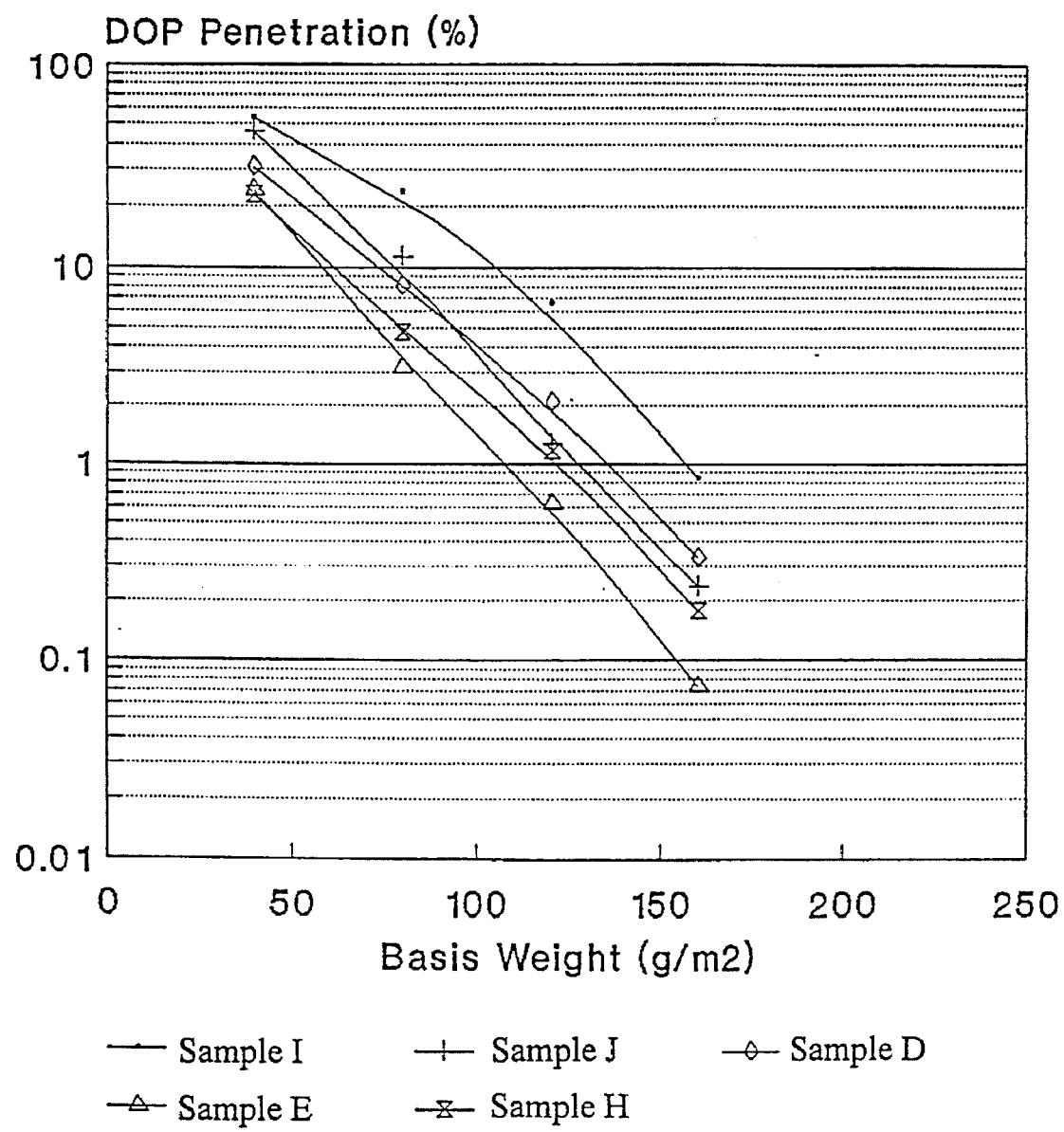
FIG. 11 is a graph plotting the log of DOP penetration vs. filter media basis weight for a variety of samples.

FIGS. 10 and 11 plot the percent penetration versus basis weight for the identified samples of Table 1, upon 200 mg of DOP loading. These data establish that sample E (0.5% fluorochemical and 1.2% fatty acid amide) exhibits the lowest penetration for a given basis weight. These data also establish that the 5% DOP penetration level standard can be achieved with the sample E material at a basis weight of 80 g/m$^2$. By comparison, sample I (which contains no charge stabilizing additive) must be used at a basis weight of 140–150 g/m$^2$ to achieve this penetration level.

Figure 12:
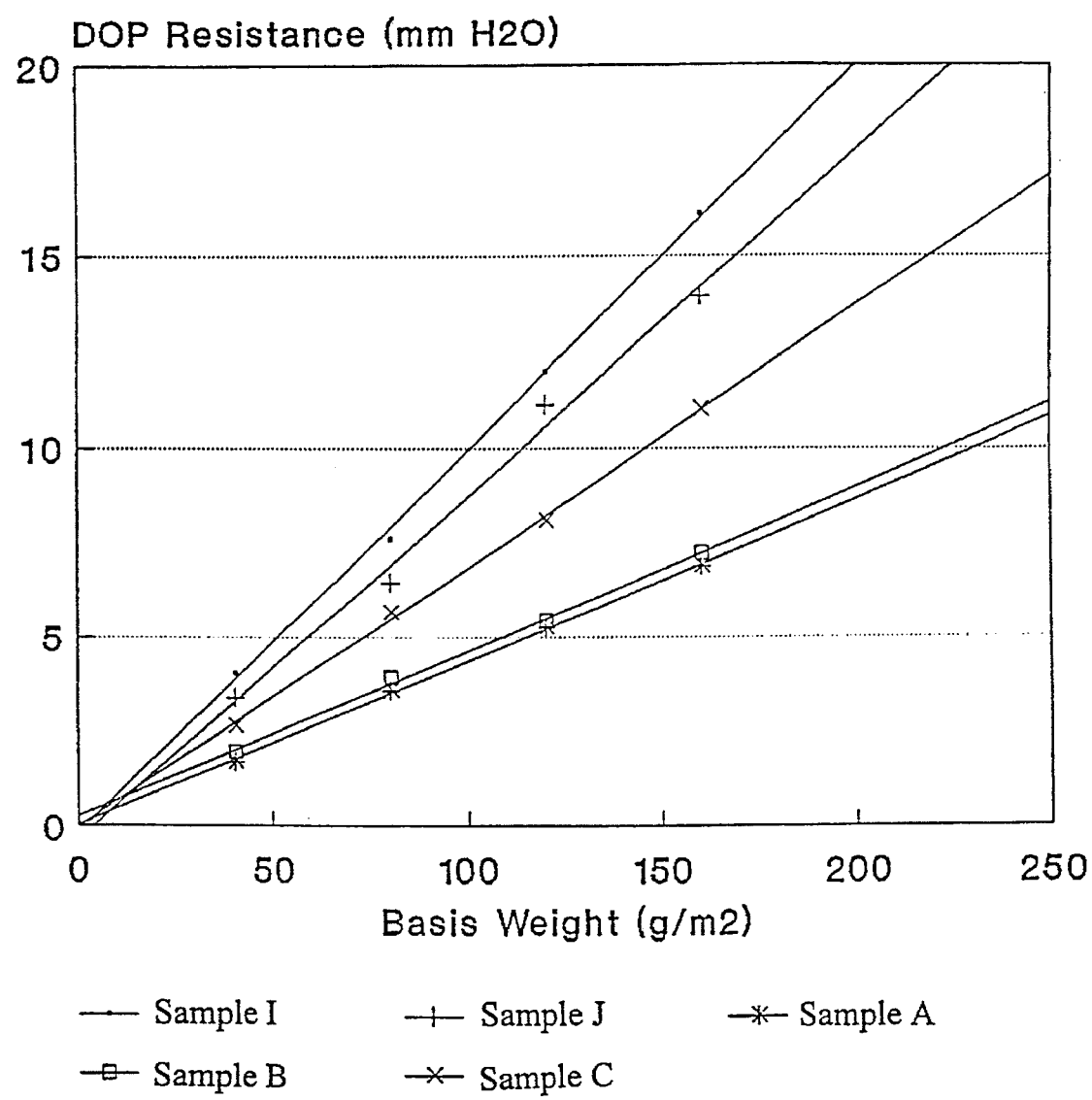
FIG. 12 is a graph plotting DOP resistance vs. filter media basis weight for various samples.
Figure 13:
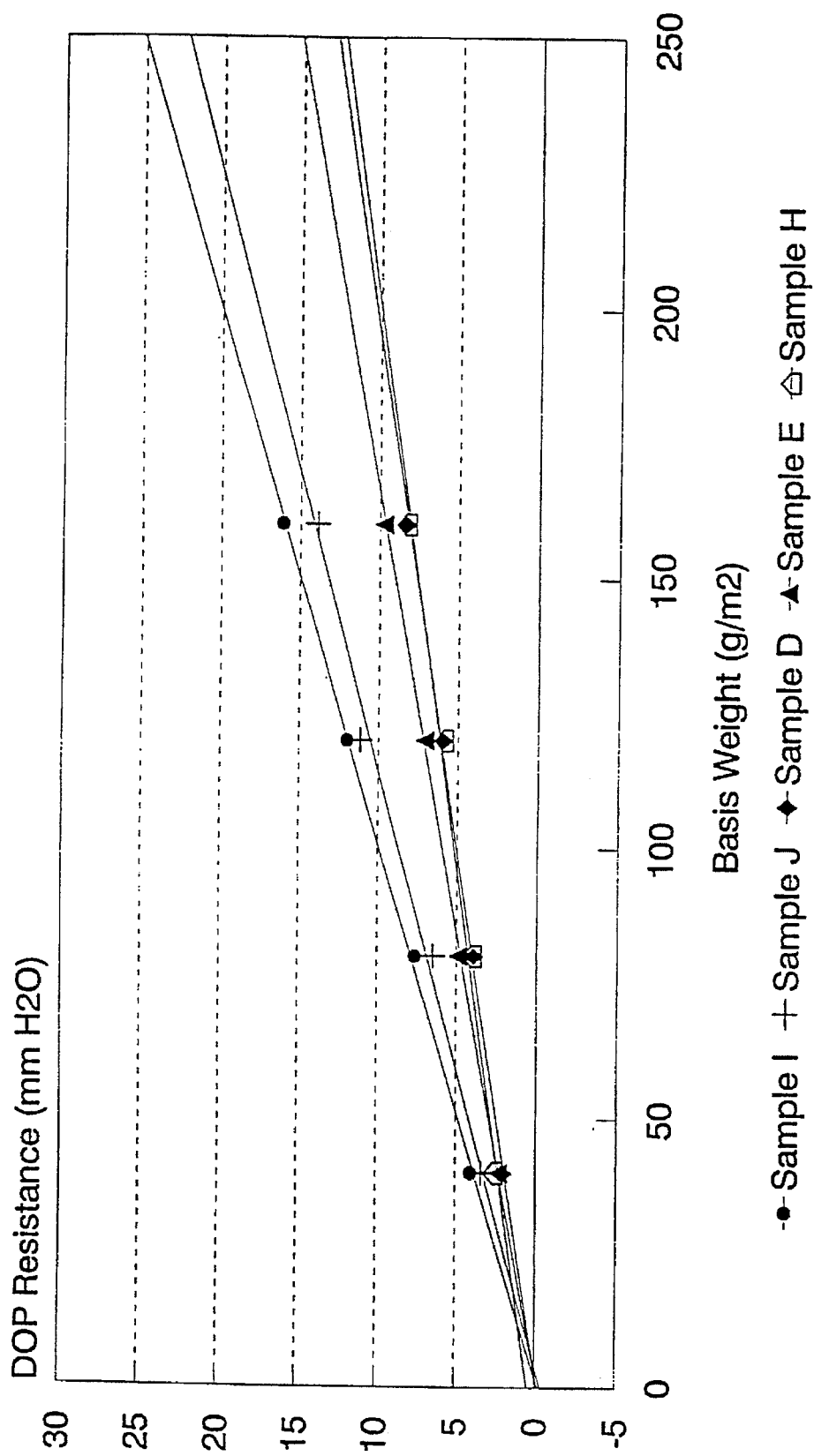
FIG. 13 is a graph plotting DOP resistance vs. filter media basis weight for various samples.

FIGS. 12 and 13 plot the resistance versus the basis weight for samples of Table 1 as a result of DOP challenge.

Figure 14:
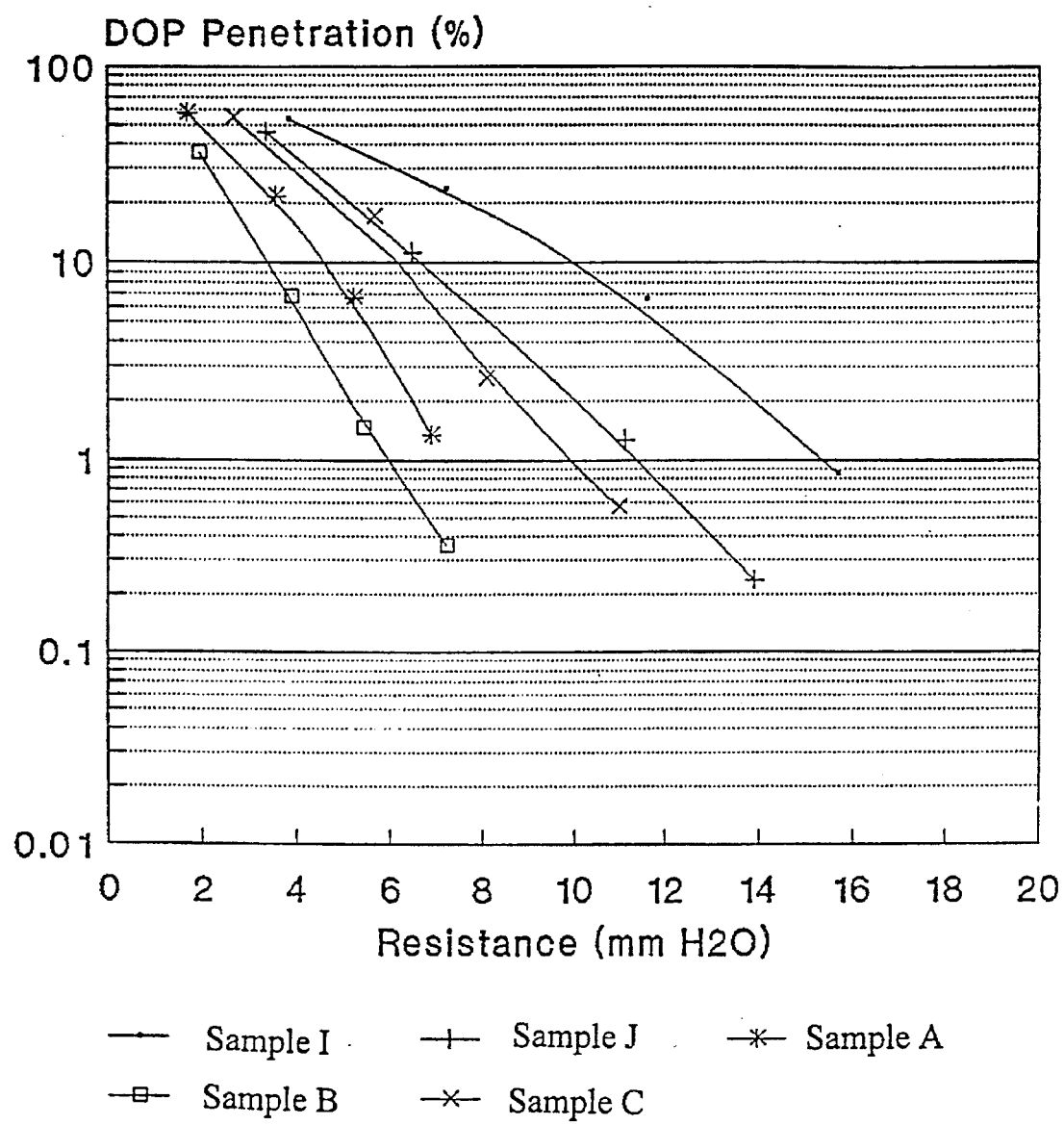
FIG. 14 is a graph plotting the log of DOP penetration vs. resistance for a variety of samples.
Figure 15:
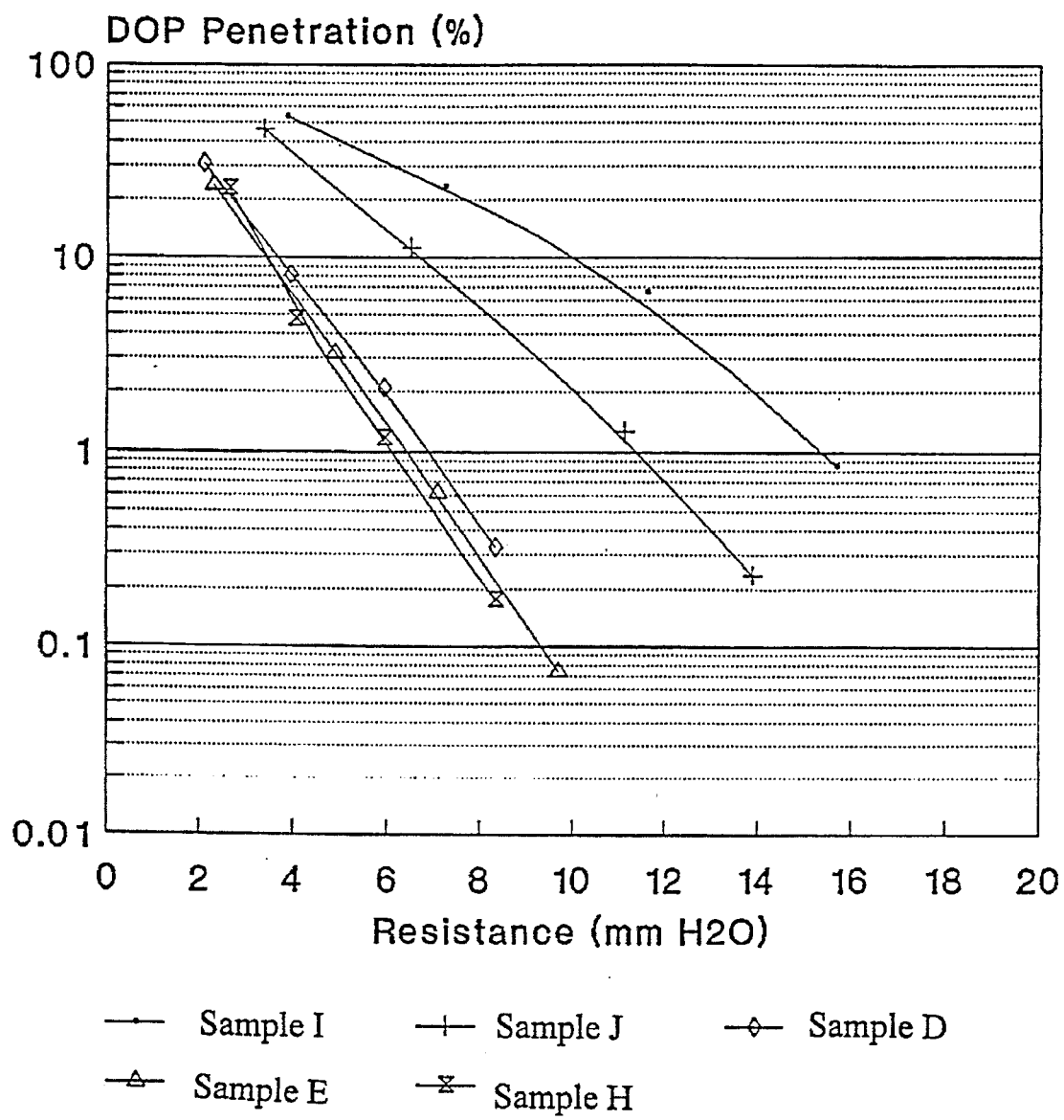
FIG. 15 is a graph plotting the log of DOP penetration vs. resistance for a variety of samples.

FIGS. 14 and 15 plot the percent penetration versus initial resistance as a result of a 200 mg DOP challenge. After this DOP challenge, the resistance changes by only about 5%. As shown by the data in FIG. 14, excellent performance is obtained by sample B (2% fluorochemical). However, FIG. 15 illustrates that samples D, E and H (fluorochemical and fatty acid amide additive mixture) offer lower resistances for a given penetration level than other samples, including sample B. The alpha performance of samples D, E and H is equivalent, but sample E may be preferred since it reaches acceptable efficiency levels of lower basis weights.

Table 3 illustrates the initial alpha values and final alpha values (after a 22 minute DOP challenge) for the samples of Table 1, based on FIGS. 6 and 7.

TABLE 3

Alpha Values for DOP Challenge

| Sample | Alpha Values For DOP Penetration | |
|---|---|---|
| | Initial Alpha | Final Alpha |
| A | 44 | 18 |
| B | 45 | 27 |
| C | 38 | 13 |
| D | 46 | 26 |
| E | 45 | 29 |
| F | 30 | 24 |
| G | — | — |
| H | 48 | 31 |
| I | 24 | 8 |
| J | 31 | 14 |

Table 4 illustrates the web basis weights necessary to achieve 5%, 1%, and 0.03% DOP penetration levels, and the resistance associated with these levels, based on data obtained from FIGS. 10 and 11.

TABLE 4

Web Basis Weights and ΔP Necessary for DOP Penetration Standards

| | Web Basis Weight (g/m²) and Resistance (mm H₂O at DOP Pen. levels) | | | | | |
|---|---|---|---|---|---|---|
| | 5% Pen. | | 1% Pen. | | 0.03% Pen. | |
| Sample | Basis wt. | ΔP | Basis wt. | ΔP | Basis wt. | ΔP |
| A | 130 | 6.0 | 170 | 7.5 | 260 | 12.0 |
| B | 90 | 4.5 | 130 | 6.5 | 225 | 10.0 |
| C | 110 | 7.5 | 145 | 10.0 | 235 | 16.0 |
| D | 100 | 5.0 | 135 | 7.0 | 220 | 11.5 |
| E | 70 | 4.0 | 110 | 6.0 | 175 | 16.0 |
| F | 85 | 5.0 | 125 | 7.0 | 235 | 12.0 |
| G | — | — | — | — | — | — |
| H | 80 | 4.5 | 120 | 6.0 | 200 | 10.0 |
| I | 125 | 12 | 160 | 17.0 | 235 | 23.0 |
| J | 90 | 8 | 125 | 11.5 | 215 | 19.0 |

EXAMPLE 2

Samples of electret filter media were prepared, according to a procedure similar to that identified in Example 1, using the charge stabilizing additives and concentrations identified in Tables 5 through 8. Tables 5A and 5B display relevant data obtained for a DOP challenge of charged (AC/DC) media samples that were not subjected to heat treatment. Tables 6A and 6B display data obtained for a DOP challenge of media samples that were heat treated at 118° C. for 1 hour before AC/DC charging. Tables 7 and 8 display relevant data obtained for a DOP challenge of media samples having the noted charge stabilizing additive mixture without pre-charging heat treatment and with pre-charging heat treatment (115° C. for 15 min.).

TABLE 5A

No Heat Pre-Charging Treatment

Charge Additive/Sample No.

| | None Control | | | Dupont ZONYL® FTS @ 1% Sample 1 | | | Dupont ZONYL® FTS @ 2% Sample 2 | | |
|---|---|---|---|---|---|---|---|---|---|
| Time (Min.) | ΔP | Pen | Alpha | ΔP | Pen | Alpha | ΔP | Pen | Alpha |
| 1 | 0.82 | 46.5 | 40.6 | 0.71 | 46.9 | 46.3 | 0.58 | 52.5 | 48.2 |
| 2 | 0.82 | 48 | 38.9 | 0.64 | 49.1 | 48.3 | 0.58 | 52.4 | 48.4 |
| 3 | 0.81 | 49.6 | 37.6 | 0.65 | 50.8 | 45.3 | 0.55 | 53.4 | 49.5 |
| 4 | 0.81 | 51.6 | 35.5 | 0.72 | 53.1 | 38.2 | 0.54 | 54.5 | 48.8 |
| 5 | 0.84 | 54.4 | 31.5 | 0.69 | 54.1 | 38.7 | 0.59 | 55.8 | 42.9 |
| 6 | 0.85 | 54 | 31.5 | 0.7 | 55.1 | 37.0 | 0.59 | 56 | 42.7 |
| 7 | 0.81 | 56 | 31.1 | 0.63 | 57.1 | 38.6 | 0.6 | 58.3 | 39.1 |
| 8 | 0.86 | 58.2 | 27.3 | 0.69 | 58.1 | 34.2 | 0.56 | 59.1 | 40.8 |
| 9 | 0.82 | 58.3 | 28.6 | 0.68 | 60.8 | 31.8 | 0.61 | 60.5 | 35.8 |
| 10 | 0.82 | 58.2 | 28.7 | 0.72 | 61.2 | 29.6 | 0.54 | 61.6 | 39.0 |
| 11 | 0.86 | 61.8 | 24.3 | 0.7 | 65.9 | 25.9 | 0.66 | 64.2 | 29.2 |
| 12 | 0.83 | 64.5 | 22.9 | 0.69 | 65.7 | 26.4 | 0.56 | 65 | 33.4 |
| 13 | 0.83 | 66 | 21.7 | 0.64 | 69.2 | 25.0 | 0.54 | 66.5 | 32.8 |
| 14 | 0.83 | 66.8 | 21.1 | 0.73 | 68.8 | 22.2 | 0.51 | 69 | 31.6 |
| 15 | 0.85 | 68.4 | 19.4 | 0.67 | 69.8 | 23.3 | 0.61 | 68.7 | 26.7 |
| 16 | 0.8 | 67.7 | 21.2 | 0.64 | 67.2 | 27.0 | 0.54 | 68.7 | 30.2 |
| 17 | 0.83 | 67.4 | 20.6 | 0.72 | 69.8 | 21.7 | 0.63 | 71 | 23.6 |
| 18 | 0.8 | 68.6 | 20.5 | 0.7 | 70.2 | 22.0 | 0.6 | 72.2 | 23.6 |
| 19 | 0.81 | 69.6 | 19.4 | | | | 0.6 | 72.2 | 23.6 |
| 20 | 0.85 | 72 | 16.8 | | | | 0.61 | 72.1 | 23.3 |

TABLE 5B

No Heat Pre-Charging Treatment

Charge Additive/Sample No.

| | None Control | | | Dupont ZONYL® FTS @ 3% Sample 3 | | | 3M FX 1801 @ 1% Sample 10 | | |
|---|---|---|---|---|---|---|---|---|---|
| Time (Min.) | ΔP | Pen | Alpha | ΔP | Pen | Alpha | ΔP | Pen | Alpha |
| 1 | 0.82 | 46.5 | 40.6 | 0.53 | 53.8 | 50.8 | 0.66 | 45.6 | 51.7 |
| 2 | 0.82 | 48 | 38.9 | 0.56 | 55.3 | 45.9 | 0.62 | 46.8 | 53.2 |
| 3 | 0.81 | 49.6 | 37.6 | 0.59 | 57.1 | 41.2 | 0.65 | 47.3 | 50.0 |
| 4 | 0.81 | 51.6 | 35.5 | 0.54 | 57 | 45.2 | 0.62 | 48 | 51.4 |
| 5 | 0.84 | 54.4 | 31.5 | 0.56 | 58.4 | 41.7 | 0.62 | 48.1 | 51.3 |
| 6 | 0.85 | 54 | 31.5 | 0.54 | 59 | 42.4 | 0.59 | 49.4 | 51.9 |
| 7 | 0.81 | 56 | 31.1 | 0.60 | 60.4 | 36.5 | 0.64 | 51.3 | 45.3 |
| 8 | 0.86 | 58.2 | 27.3 | 0.56 | 61.3 | 38.0 | 0.6 | 52.4 | 46.8 |
| 9 | 0.82 | 58.3 | 28.6 | 0.63 | 62 | 33.0 | 0.61 | 52.6 | 45.7 |
| 10 | 0.82 | 58.2 | 28.7 | 0.61 | 63.3 | 32.6 | 0.6 | 54 | 44.6 |
| 11 | 0.86 | 61.8 | 24.3 | 0.58 | 65.2 | 32.0 | 0.62 | 55.6 | 41.1 |
| 12 | 0.83 | 64.5 | 22.9 | 0.55 | 66.2 | 32.6 | 0.61 | 56.8 | 40.3 |
| 13 | 0.83 | 66 | 21.7 | 0.60 | 66.7 | 29.3 | 0.62 | 59.3 | 36.6 |
| 14 | 0.83 | 66.8 | 21.1 | 0.54 | 69 | 29.8 | 0.64 | 57.4 | 37.7 |
| 15 | 0.85 | 68.4 | 19.4 | 0.54 | 67.8 | 31.3 | 0.63 | 59.9 | 35.3 |
| 16 | 0.8 | 67.7 | 21.2 | 0.57 | 68.8 | 28.5 | 0.63 | 62.7 | 32.2 |
| 17 | 0.83 | 67.4 | 20.6 | 0.57 | 69 | 28.3 | 0.61 | 65.2 | 30.5 |
| 18 | 0.8 | 68.6 | 20.5 | 0.57 | 71.1 | 26.0 | 0.68 | 65 | 27.5 |
| 19 | 0.81 | 69.6 | 19.4 | 0.53 | 71.9 | 27.0 | 0.6 | 66.9 | 29.1 |
| 20 | 0.85 | 72 | 16.8 | 0.59 | 72 | 24.2 | | | |

TABLE 6A

One Hour Heat Treatment Before Charging

Charge Additive/Sample No.

| | None Control H | | | Dupont ZONYL® FTS @ 1% Sample 1-H | | | Dupont ZONYL® FTS @ 2% Sample 2-H | | |
|---|---|---|---|---|---|---|---|---|---|
| Time (Min.) | ΔP | Pen | Alpha | ΔP | Pen | Alpha | ΔP | Pen | Alpha |
| 1 | 0.81 | 45.4 | 42.3 | 0.68 | 47.1 | 48.1 | 0.53 | 51.6 | 54.2 |
| 2 | 0.79 | 47.5 | 40.9 | 0.58 | 50 | 51.9 | 0.5 | 53.7 | 54.0 |
| 3 | 0.83 | 48.6 | 37.8 | 0.66 | 51.6 | 43.5 | 0.49 | 55.6 | 52.0 |
| 4 | 0.8 | 50.2 | 37.4 | 0.7 | 53.7 | 38.6 | 0.6 | 55 | 43.3 |
| 5 | 0.82 | 50.7 | 36.0 | 0.67 | 54.9 | 38.9 | 0.45 | 56.8 | 54.6 |
| 6 | 0.91 | 52.1 | 31.1 | 0.67 | 55.6 | 38.0 | 0.56 | 58.7 | 41.3 |
| 7 | 0.84 | 54.3 | 31.6 | 0.61 | 59.2 | 37.3 | 0.52 | 59.5 | 43.4 |
| 8 | 0.85 | 54.9 | 30.6 | 0.62 | 59.8 | 36.0 | 0.54 | 62.4 | 37.9 |
| 9 | 0.86 | 55.4 | 29.8 | 0.59 | 61.1 | 36.3 | 0.55 | 62.4 | 37.2 |
| 10 | 0.78 | 56.8 | 31.5 | 0.63 | 62.4 | 32.5 | 0.51 | 63.4 | 38.8 |
| 11 | 0.8 | 57.2 | 30.3 | 0.64 | 62.6 | 31.8 | 0.55 | 62.3 | 37.4 |
| 12 | 0.89 | 59.5 | 25.3 | 0.64 | 65.5 | 28.7 | 0.56 | 63.5 | 35.2 |
| 13 | 0.84 | 59.7 | 26.7 | 0.69 | 65.8 | 26.3 | 0.5 | 65 | 37.4 |
| 14 | 0.81 | 60.9 | 26.6 | 0.66 | 68.5 | 24.9 | 0.51 | 65.5 | 36.0 |
| 15 | 0.87 | 62.6 | 23.4 | 0.67 | 70.3 | 22.8 | 0.46 | 67.7 | 36.8 |
| 16 | 0.87 | 65 | 21.5 | 0.72 | 70.6 | 21.0 | 0.54 | 68.2 | 30.8 |
| 17 | 0.87 | 64.3 | 22.0 | 0.67 | 72.6 | 20.8 | 0.5 | 69.6 | 31.5 |
| 18 | 0.79 | 66 | 22.8 | 0.7 | 72.6 | 19.9 | 0.51 | 69.5 | 31.0 |
| 19 | 0.88 | 68 | 19.0 | 0.67 | 75.3 | 18.4 | 0.54 | 72.7 | 25.6 |
| 20 | 0.88 | 67.5 | 19.4 | 0.67 | 75.5 | 18.2 | 0.52 | 72.5 | 26.9 |

TABLE 6B

One Hour Heat Treatment Before Charging

Charge Additive/Sample No.

| | None Control H | | | Dupont ZONYL® FTS @ 3% Sample 3-H | | | 3M FX 1801 @ 1% Sample 10-H | | |
|---|---|---|---|---|---|---|---|---|---|
| Time (Min.) | ΔP | Pen | Alpha | ΔP | Pen | Alpha | ΔP | Pen | Alpha |
| 1 | 0.81 | 45.4 | 42.3 | 0.47 | 54.4 | 56.3 | 0.52 | 46.3 | 64.3 |
| 2 | 0.79 | 47.5 | 40.9 | 0.38 | 56.9 | 64.4 | 0.57 | 45.7 | 59.7 |
| 3 | 0.83 | 48.6 | 37.8 | 0.43 | 56.9 | 57.0 | 0.57 | 46.4 | 58.5 |
| 4 | 0.8 | 50.2 | 37.4 | 0.45 | 58.4 | 51.9 | 0.63 | 48 | 50.6 |
| 5 | 0.82 | 50.7 | 36.0 | 0.45 | 59.8 | 49.6 | 0.56 | 47.9 | 57.1 |
| 6 | 0.91 | 52.1 | 31.1 | 0.43 | 58 | 55.0 | 0.57 | 48.6 | 55.0 |
| 7 | 0.84 | 54.3 | 31.6 | 0.47 | 60.6 | 46.3 | 0.62 | 49.9 | 48.7 |
| 8 | 0.85 | 54.9 | 30.6 | 0.45 | 61.3 | 47.2 | 0.56 | 49.4 | 54.7 |
| 9 | 0.86 | 55.4 | 29.8 | 0.42 | 62.2 | 49.1 | 0.61 | 51.3 | 47.5 |
| 10 | 0.78 | 56.8 | 31.5 | 0.44 | 63 | 45.6 | 0.62 | 50.8 | 47.4 |
| 11 | 0.8 | 57.2 | 30.3 | 0.48 | 66.9 | 36.4 | 0.63 | 51.7 | 45.5 |
| 12 | 0.89 | 59.5 | 25.3 | 0.5 | 68.5 | 32.9 | 0.66 | 52.9 | 41.9 |
| 13 | 0.84 | 59.7 | 26.7 | 0.42 | 67.3 | 40.9 | 0.62 | 54 | 43.2 |
| 14 | 0.81 | 60.9 | 26.6 | 0.44 | 69.6 | 35.8 | 0.58 | 53.6 | 46.7 |
| 15 | 0.87 | 62.6 | 23.4 | 0.44 | 70.2 | 34.9 | 0.58 | 54.8 | 45.0 |
| 16 | 0.87 | 65 | 21.5 | 0.47 | 68.8 | 34.6 | 0.63 | 55 | 41.2 |
| 17 | 0.87 | 64.3 | 22.0 | 0.44 | 70.6 | 34.4 | 0.6 | 56.2 | 41.7 |
| 18 | 0.79 | 66 | 22.8 | 0.41 | 72 | 34.8 | 0.64 | 55.8 | 39.6 |
| 19 | 0.88 | 68 | 19.0 | 0.46 | 72.1 | 30.9 | 0.6 | 56.3 | 41.6 |
| 20 | 0.88 | 67.5 | 19.4 | | | | | | |

TABLE 7

Effect Of Charge Stabilizing Additive Mixtures Without Pre-Charging Heat Treatment

| | ADDITIVES | | | | Fiber | Pen. | ΔP | Alpha |
|---|---|---|---|---|---|---|---|---|
| No. | Acra.[1] | FTS[2] | FX[3] | BW[4] | D. | Init./Final | Init./Final | Init./Final |
| 1 | 0.66 | — | 0.94 | 25.0 | 4.8 | 55.0/74.0 | 0.9/0.9 | 28.8/14.5 |
| 2 | 0.61 | — | 1.64 | 22.3 | 4.4 | 52.0/76.0 | 0.7/0.7 | 40.6/17.0 |
| 3 | 0.57 | — | 2.29 | 27.0 | 4.5 | 51.0/75.0 | 0.9/0.9 | 32.5/13.9 |
| 4 | 1.28 | — | 0.85 | 18.6 | 6.0 | 72.0/85.0 | 0.4/0.4 | 35.7/17.6 |
| 5 | 1.19 | — | 1.58 | 20.0 | 4.9 | 67.0/79.0 | 0.5/0.6 | 34.8/18.6 |
| 6 | 1.11 | — | 2.21 | 22.9 | 4.6 | 55.0/69.5 | 0.8/0.8 | 34.6/21.1 |
| 7 | 0.72 | 0.96 | — | 24.6 | 5.5 | 55.0/71.0 | 0.6/0.6 | 43.3/24.8 |
| 8 | 0.72 | 1.92 | — | 19.9 | 5.7 | 57.0/74.0 | 0.6/0.6 | 40.7/21.8 |
| 9 | 0.72 | 2.89 | — | 22.3 | 5.4 | 60.0/68.0 | 0.6/0.6 | 37.0/27.9 |
| 10 | 1.38 | 0.93 | — | 22.4 | 5.3 | 54.0/70.0 | 0.6/0.6 | 44.6/25.8 |
| 11 | 1.38 | 1.85 | — | 19.2 | 6.2 | 66.0/74.0 | 0.4/0.4 | 45.1/32.7 |
| 12 | 1.38 | 2.77 | — | 19.4 | 5.1 | 65.0/74.0 | 0.5/0.5 | 37.4/26.2 |

[1] ACRAWAX®C
[2] ZONYL®
[3] Scotchban® Protector FX-1801.
[4] Basis Weight (g./m²)

TABLE 8

Effect Of Charge Stabilizing Additive Mixtures
With Pre-Charging Heat Treatment[5]

| | ADDITIVES | | | | Fiber | Pen. | ΔP | Alpha |
|---|---|---|---|---|---|---|---|---|
| No. | Acra.[1] | FTS[2] | FX[3] | BW[4] | D. | Init./Final | Init./Final | Init./Final |
| 1 | 0.66 | — | 0.94 | 25.0 | 4.8 | 81.0/86.0 | 0.7/0.7 | 13.1/9.4 |
| 2 | 0.61 | — | 1.64 | 22.3 | 4.4 | 85.0/87.0 | 0.6/0.6 | 11.8/10.1 |
| 3 | 0.57 | — | 2.29 | 27.0 | 4.5 | 77.0/77.0 | 0.9/0.9 | 12.6/12.6 |
| 4 | 1.28 | — | 0.85 | 18.6 | 6.0 | 88.0/91.0 | 0.8/0.8 | 6.9/5.1 |
| 5 | 1.19 | — | 1.58 | 20.0 | 4.9 | 82.0/91.0 | 0.9/1.0 | 9.6/4.1 |
| 6 | 1.11 | — | 2.21 | 22.9 | 4.6 | 80.0/90.0 | 1.1/1.1 | 8.8/4.2 |
| 7 | 0.72 | 0.96 | — | 24.6 | 5.5 | 85.0/85.0 | 0.7/0.8 | 10.1/8.8 |
| 8 | 0.72 | 1.92 | — | 19.9 | 5.7 | 83.0/85.0 | 0.7/0.8 | 11.6/8.8 |
| 9 | 0.72 | 2.89 | — | 22.3 | 5.4 | 80.0/88.0 | 0.9/1.0 | 10.8/5.6 |
| 10 | 1.38 | 0.93 | — | 22.4 | 5.3 | 86.0/82.0 | 1.0/0.7 | 6.6/12.3 |
| 11 | 1.38 | 1.85 | — | 19.2 | 6.2 | 85.0/90.0 | 0.6/0.6 | 11.8/7.6 |
| 12 | 1.38 | 2.77 | — | 19.4 | 5.1 | 85.0/87.0 | 0.6/0.6 | 11.8/10.1 |

[1]ACRAWAX ®C
[2]ZONYL ®
[3]Scotchban ® Protector FX-1801.
[4]Basis Weight (g./m$^2$)
[5]Heat treated at 115° C. for 15 min.

One of ordinary skill in the art will appreciate that various modifications can be made to this invention without departing from its intended scope.

What is claimed is:

1. A filter media comprising an electret melt-blown polymer fiber web having a charge stabilizing melt-blown additive selected from the group consisting of stearic esters of perfluoroalcohols; and mixtures of nonionic fatty acid amides with nonionic, oleophobic fluorochemical surfactants, wherein the melt-blown additive is present at a concentration in the range of about 0.1 to 3.5% by weight to thereby reduce alpha decay in the electret melt-blown polymer fiber web.

2. The filter media of claim 1 wherein the fluorochemical surfactant is selected from the group consisting of fluorochemical oxazolidinones and stearic esters of perfluoroalcohols.

3. The filter media of claim 2 wherein the fluorochemical oxazolidinone is a fluorochemical urethane derivative.

4. The filter media of claim 1 wherein the electret melt-blown polymer fiber web is a polypropylene.

5. The filter media of claim 1 comprises enhanced charge stability of the electret melt-blown polymer fiber web.

6. The filter media of claim 1 wherein the non-ionic fatty acid amides are selected from the group consisting of stearamide and ethylene bis-stearamide.

7. The filter media of claim 1 wherein the melt-blown additive comprises a mixture of about 0.5 to 1.2% by weight of a fatty acid amide and 0.4 to 0.8% by weight of a non-ionic, oleophobic fluorochemical surfactant.

8. The filter media of claim 1 wherein the melt-blown additive comprises about 0.5 to 1.4% by weight of the fatty acid amide and about 2.0 to 3.0% by weight of the fluorochemical surfactant.

9. The filter media of claim 1 wherein polymer fibers of the melt-blown polymer fiber web have a diameter in the range of about 1 to 20 μm.

10. The filter media of claim 9 wherein the weight of the melt-blown polymer fiber web is in the range of about 10 to 520 g/m$^2$.

* * * * *